(12) United States Patent
McDevitt et al.

(10) Patent No.: US 11,477,602 B2
(45) Date of Patent: Oct. 18, 2022

(54) SYSTEMS AND METHODS FOR OPTIMIZING AND REFINING MESSAGE NOTIFICATION TIMING

(71) Applicant: Verizon Patent and Licensing Inc., Basking Ridge, NJ (US)

(72) Inventors: Patrick McDevitt, Hanover, NH (US); Joseph Hughes, Lancaster, PA (US); Jon Szymanski, Severna Park, MD (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1211 days.

(21) Appl. No.: 14/300,866

(22) Filed: Jun. 10, 2014

(65) Prior Publication Data

US 2015/0358766 A1     Dec. 10, 2015

(51) Int. Cl.
*H04W 4/021*     (2018.01)
*G06Q 30/02*     (2012.01)
(Continued)

(52) U.S. Cl.
CPC ........ *H04W 4/021* (2013.01); *G06Q 30/0261* (2013.01); *G06Q 30/0267* (2013.01);
(Continued)

(58) Field of Classification Search
CPC ....... H04W 4/021; H04W 4/12; H04W 64/00; H04W 4/02; G06Q 30/0261; G06Q 30/0267; H04L 51/20; H04L 51/24; H04L 67/26; H04L 67/20; H04L 67/325; H04L 67/327
See application file for complete search history.

(56) References Cited

U.S. PATENT DOCUMENTS 5,946,618 A    8/1999 Agre et al.
6,601,012 B1   7/2003 Horvitz et al.
(Continued)

FOREIGN PATENT DOCUMENTS

CN    103329159 A  *  9/2013  ............. G06Q 50/30
EP       2584516        4/2013
(Continued)

OTHER PUBLICATIONS

Reed, B. (2011). New AT&T app blocks SMS junkies from texting while driving; new AT&T DriveMode debuts in time for labor day. Network World, , NA. Retrieved from https://dialog.proquest.com/professional/docview/887672963?accountid=131444 (Year: 2011).*
(Continued)

*Primary Examiner* — Kambiz Abdi
*Assistant Examiner* — Scott Snider

(57) ABSTRACT

Systems and methods are provided for determining release weights for geographic locations and specific times for selected users, and optimizing the timing of message notifications for a mobile device based on those release weights. The release weights may be determined based 1) generalized factors, 2) factors individualized for a particular mobile device user, and/or 3) real-time factors. These release weights are calculated to represent a user's likeliness to launch a client application from a message notification at a given time and geographic location.

19 Claims, 10 Drawing Sheets

(51) Int. Cl.
*H04W 4/12* (2009.01)
*H04L 51/222* (2022.01)
*H04L 51/224* (2022.01)
*H04L 67/53* (2022.01)
*H04L 67/62* (2022.01)
*H04L 67/63* (2022.01)
*H04W 64/00* (2009.01)
*H04L 67/55* (2022.01)

(52) U.S. Cl.
CPC .......... *H04L 51/222* (2022.05); *H04L 51/224* (2022.05); *H04L 67/55* (2022.05); *H04W 4/12* (2013.01); *H04W 64/00* (2013.01); *H04L 67/53* (2022.05); *H04L 67/62* (2022.05); *H04L 67/63* (2022.05)

(56) References Cited

U.S. PATENT DOCUMENTS

| | | |
|---|---|---|
| 7,418,451 B2 | 8/2008 | Leung et al. |
| 8,489,111 B2 | 7/2013 | Chawla |
| 8,532,667 B2 | 9/2013 | Chan et al. |
| 8,943,126 B1 | 1/2015 | Feldman |
| 9,015,692 B1 | 4/2015 | Clavel |
| 9,043,329 B1 | 5/2015 | Patton et al. |
| 9,786,170 B2 | 10/2017 | Roy et al. |
| 2002/0069037 A1 | 6/2002 | Hendrickson et al. |
| 2003/0115586 A1 | 6/2003 | Lejouan et al. |
| 2004/0030753 A1 | 2/2004 | Horvitz |
| 2004/0166878 A1 | 8/2004 | Erskine et al. |
| 2005/0039136 A1 | 2/2005 | Othmer |
| 2005/0209921 A1 | 9/2005 | Roberts et al. |
| 2006/0109857 A1 | 5/2006 | Herrmann |
| 2007/0088603 A1* | 4/2007 | Jouppi ............ G06Q 30/02 705/14.66 |
| 2007/0232274 A1* | 10/2007 | Jung ............ H04M 1/72552 455/412.1 |
| 2008/0262928 A1 | 10/2008 | Michaelis |
| 2008/0288976 A1 | 11/2008 | Carson et al. |
| 2009/0006145 A1 | 1/2009 | Duggal et al. |
| 2009/0006194 A1* | 1/2009 | Sridharan .......... G06Q 30/0273 705/14.62 |
| 2010/0113066 A1 | 5/2010 | Dingler et al. |
| 2010/0159904 A1 | 6/2010 | Colligan et al. |
| 2010/0293170 A1* | 11/2010 | Hall ............ H04L 51/32 707/750 |
| 2010/0323716 A1 | 12/2010 | Jaffri |
| 2010/0324995 A1 | 12/2010 | Ward et al. |
| 2011/0195748 A1 | 8/2011 | Main et al. |
| 2011/0208592 A1 | 8/2011 | Golder |
| 2012/0023548 A1 | 1/2012 | Alfano et al. |
| 2012/0130796 A1* | 5/2012 | Busch ............ G06Q 30/0267 705/14.36 |
| 2012/0159568 A1 | 6/2012 | He |
| 2012/0225672 A1 | 9/2012 | Tholkes et al. |
| 2012/0278194 A1 | 11/2012 | Dewan et al. |
| 2012/0284107 A1 | 11/2012 | Gernaat et al. |
| 2012/0306660 A1 | 12/2012 | Stopel et al. |
| 2012/0310527 A1 | 12/2012 | Yariv et al. |
| 2012/0323692 A1 | 12/2012 | Shutter |
| 2013/0091016 A1 | 4/2013 | Shutter |
| 2013/0103307 A1 | 4/2013 | Sartipi et al. |
| 2013/0110649 A1 | 5/2013 | Sugiura et al. |
| 2013/0149993 A1 | 6/2013 | Cao et al. |
| 2013/0159463 A1 | 6/2013 | Bentley et al. |
| 2013/0235027 A1 | 9/2013 | Sharifi et al. |
| 2013/0252630 A1 | 9/2013 | Edge et al. |
| 2013/0267196 A1 | 10/2013 | Leemet et al. |
| 2013/0267253 A1 | 10/2013 | Case et al. |
| 2013/0275198 A1 | 10/2013 | Zeto et al. |
| 2013/0304910 A1 | 11/2013 | Hanlon et al. |
| 2013/0318157 A1 | 11/2013 | Harrison |
| 2013/0332274 A1 | 12/2013 | Faith et al. |
| 2014/0019230 A1 | 1/2014 | Lawson |
| 2014/0082062 A1 | 3/2014 | Bellver et al. |
| 2014/0095296 A1 | 4/2014 | Angell et al. |
| 2014/0095617 A1 | 4/2014 | Chan et al. |
| 2014/0101685 A1 | 4/2014 | Kitts et al. |
| 2014/0155094 A1 | 6/2014 | Zises |
| 2014/0156410 A1 | 6/2014 | Wuersch et al. |
| 2014/0164118 A1 | 6/2014 | Polachi |
| 2014/0188956 A1 | 7/2014 | Subba et al. |
| 2014/0242947 A1 | 8/2014 | Ali et al. |
| 2014/0278920 A1 | 9/2014 | Holden |
| 2014/0309864 A1 | 10/2014 | Ricci |
| 2014/0344050 A1 | 11/2014 | McKinley et al. |
| 2014/0379520 A1* | 12/2014 | Nemery ............ G06Q 30/0631 705/26.7 |
| 2015/0073709 A1 | 3/2015 | Huang |
| 2015/0095355 A1 | 4/2015 | Patton |
| 2015/0105106 A1* | 4/2015 | Masterman ............ H04W 68/00 455/456.3 |
| 2015/0142789 A1* | 5/2015 | Parundekar ........ G06Q 30/0251 707/724 |
| 2015/0148061 A1 | 5/2015 | Koukoumidis et al. |
| 2015/0163629 A1 | 6/2015 | Cheung |
| 2015/0181016 A1 | 6/2015 | Jain et al. |
| 2015/0186497 A1 | 7/2015 | Patton et al. |
| 2015/0207893 A1 | 7/2015 | Lee |
| 2015/0249632 A1 | 9/2015 | Barrand et al. |
| 2015/0326624 A1 | 11/2015 | Rajendran et al. |
| 2016/0034712 A1 | 2/2016 | Patton et al. |
| 2016/0344824 A1* | 11/2016 | Wilden .................. H04L 51/32 |

FOREIGN PATENT DOCUMENTS

| | | | |
|---|---|---|---|
| WO | WO 2012/087472 A1 | 6/2012 | |
| WO | WO 2012087472 A1 * | 6/2012 | ......... G06Q 30/0224 |

OTHER PUBLICATIONS

Louisiana joins in the national "it can wait" movement to halt texting while driving: Louisiana hosts local event encouraging people to pledge "no text on board". (Sep. 19, 2012). U.S.Newswire Retrieved from https://dialog.proquest.com/professional/docview/1069240199?accountid=131444 (Year: 2012).*

David, "T-Mobile Introduces Drive Smart Android App, Block Texting While Driving", TmoNews.com, Jan. 19, 2011, https://web.archive.org/web/20110123001021/https://www.tmonews.com/2011/01/t-mobile-introduces-drive-smart-android-app-block-texting-while-driving/ (Year: 2011).*

European Extended Search Report for corresponding European Application No. 15171436.7, dated Nov. 11, 2015 (7 pages).

Chava, et al., "Cost-Aware Mobile Web Browsing", in IEEE Pervasive Computing, vol. 11, No. 3, pp. 34-42, Mar. 2012, doi: 10.1109/MPRV.2012.19. (Year: 2012).

Kotsis, et al., "Generative workload models of Internet traffic", Proceedings of ICICS, 1997 International Conference an Information, Communications and Signal Processing. Theme: Trends in Information Systems Engineering and Wireless Multimedia Communications (Year: 1997).

Tian, et al., "Intelligent advertising framework for digital signage", In Proceedings of the 18th ACM SIGKDD International conference on Knowledge discovery and data mining (KDD '12). ACM, New York, NY, USA, 1532-1535. D0l=http://dx.doi.org/10.1145/2339530.2339773.

* cited by examiner

SYSTEMS AND METHODS FOR OPTIMIZING AND REFINING MESSAGE NOTIFICATION TIMING

TECHNICAL FIELD

The present disclosure relates generally to location-based messaging and, more particularly, to optimizing messaging services to mobile device users based on their respective likelihoods of opening a client application.

BACKGROUND

Mobile devices, such as smartphones, now allow users to perform a variety of tasks that traditionally required different types of devices. For example, a user may be able to use different client applications executable at the same mobile device to browse online content, play audio files, capture digital images, view directions for navigating between different locations or points of interest, and exchange messages between other users or computing devices via a mobile communications network. A user may also download and install various third-party client applications at the user's mobile device for viewing information and content related to general topics of interest. An application developer or affiliated service provider may use such a client application to provide different services to the user. Such services may include messaging services to which the user may subscribe in order to receive, for example, real-time message notifications or breaking news alerts at the user's mobile device. The message notifications or alerts that are sent (or "pushed") by a service provider for a particular client application may be displayed within a general notifications window via a user interface of the operating system at the user's mobile device, even though the client application may be closed or may not be actively executing at the mobile device when such notifications are received.

In addition to the message notifications or alerts provided by a service provider associated with the client application, third-party content providers may use the client application to deliver targeted content (e.g., advertisements) to the user at the mobile device. In contrast with the aforementioned message notifications that may be displayed within a general notifications window of the operating system's user interface, the targeted content from a third-party content provider is typically displayed within a dedicated portion of a user interface of the client application itself while it executes at the mobile device. An example of such targeted content may include, but is not limited to, an advertisement displayed within a pop-up window for a webpage loaded within a mobile web browser. Thus, conventional solutions for delivering targeted content to a user's mobile device typically require the client application to be open or actively executing at the mobile device in order for the content to be displayed to the user at the mobile device.

SUMMARY OF THE DISCLOSURE

Embodiments of the present disclosure include systems and methods for timing message notifications to optimize delivery of targeted content to mobile device users by increasing the likelihood a user will open or execute a client application.

According to certain embodiments, methods are disclosed for deploying a dynamic geo-fence to contain geographic areas having a threshold level of content consumption. Determining a release weight based for each of a plurality of geographic locations at a plurality of times, wherein the release weight is based on least two of a general factor, a user-specific factor, and a real-time factor; receiving an indication of a message to be sent for a client application executable at a mobile device of a user; upon receiving the indication of a message, requesting a current geographic location of the mobile device via a communication network; and upon receiving the requested current geographic location of the mobile device, determining whether to send the message based on the release weight for the current time and current geographic location of the mobile device. The method may also include the release weight is one of two states; a first state indicates the message should be sent and a second state indicates the message should not be sent; when the release weight of the current geographic location of the mobile device is the first state, sending the message for display to the user at the mobile device via a message notification interface of an operating system of the mobile device; when the release weight of the current geographic location of the mobile device is the second state, adding the message to a message queue; the release weight is weight with more than two values; receiving a message weight associated with the message to be sent; and when the release weight of the current geographic location of the mobile device is determined to exceed the message weight, sending the message for display to the user at the mobile device via a message notification interface of an operating system of the mobile device; when the release weight of the current geographic location of the mobile device is determined to be less than or equal to the message weight, adding the message to a message queue; displaying the added message from the message queue to the user at the mobile device when the release weight associated with the current time exceeds the message weight, a detected change in the current geographic location of the mobile device is determined and the release weight associated with the current geographic location exceeds the message weight, or once the predetermined period of time is determined to have elapsed; upon receiving an indication of an updated time or updated current geographic location of the mobile device, determining whether the release weight of the updated time or updated current geographic location of the mobile device exceeds the message weight; and displaying the message from the message queue to the user within the message notification view when the release weight of the updated time or updated current geographic location of the mobile device is determined to exceed the message weight; upon receiving the requested current geographic location of the mobile device, determining whether the current geographic location of the mobile device is within a geo-fence associated with targeted content; and when the current geographic location of the mobile device is determined to be within a geo-fence associated with targeted content, sending targeted content associated with the geo-fence for display to the user within a client application; the targeted content is an electronic advertisement provided by a third-party content provider that is not directly associated with the client application; the predetermined period of time is based on an expiration time associated with the message that is added to the message queue, and the message is sent from the message queue for display to the user at the mobile device when either the release weight of the current time and current geographic location of the mobile device is later determined to exceed the message weight before the expiration time has elapsed or once the expiration time for the message is determined to have elapsed; wherein the expiration time associated with the message is based on a priority level assigned to the message by an application service provider associated with the client application; wherein the general factor is based on at least one of historic content consumption, historic content creation, assumptions; wherein the use factor is based on at least one of historic user activity, and direct feedback; and wherein the real-time factor is based on at least one of movement of the mobile device and current content consumption.

According to certain embodiments, systems are disclosed for deploying a dynamic geo-fence to contain geographic areas having a threshold level of content consumption. One system includes a memory having processor-readable instructions stored therein and a processor configured to access the memory and execute the processor-readable instructions, which when executed by the processor configures the processor to perform a plurality of functions, including functions to: determine a release weight based for each of a plurality of geographic locations at a plurality of times, wherein the release weight is one of two states and is based on least two of a general factor, a user-specific factor, and a real-time factor; receive an indication of a message to be sent for a client application executable at a mobile device of a user; upon receiving the indication of a message, request a current geographic location of the mobile device via a communication network; and upon receiving the requested current geographic location of the mobile device, determine whether to send the message based on the release weight for the current time and current geographic location of the mobile device. In certain embodiments, processor may be configured to perform functions to: a first state of the release weight indicates the message should be sent and a second state of the release weight indicates the message should not be sent; and when the release weight of the current geographic location of the mobile device is the first state, send the message for display to the user at the mobile device via a message notification interface of an operating system of the mobile device; and when the release weight of the current geographic location of the mobile device is the second state, add the message to a message queue.

According to certain embodiments, a computer readable medium is disclosed as storing instructions that, when executed by a computer, cause the computer to perform functions to: determine a release weight based for each of a plurality of geographic locations at a plurality of times, wherein the release weight is one of two states and is based on least two of a general factor, a user-specific factor, and a real-time factor; receive an indication of a message to be sent for a client application executable at a mobile device of a user; receiving a message weight associated with the message to be sent; and upon receiving the indication of a message, request a current geographic location of the mobile device via a communication network; and upon receiving the requested current geographic location of the mobile device, determine whether to the release weight for the current time and current geographic location exceeds the message weight; when the release weight of the current time and current geographic location of the mobile device is determined to exceed the message weight, send the message for display to the user at the mobile device via a message notification interface of an operating system of the mobile device.

It is to be understood that both the foregoing general description and the following detailed description are exemplary and explanatory only and are not restrictive of the scope of disclosed embodiments, as set forth by the claims.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DESCRIPTION OF THE EMBODIMENTS

Figure 1:
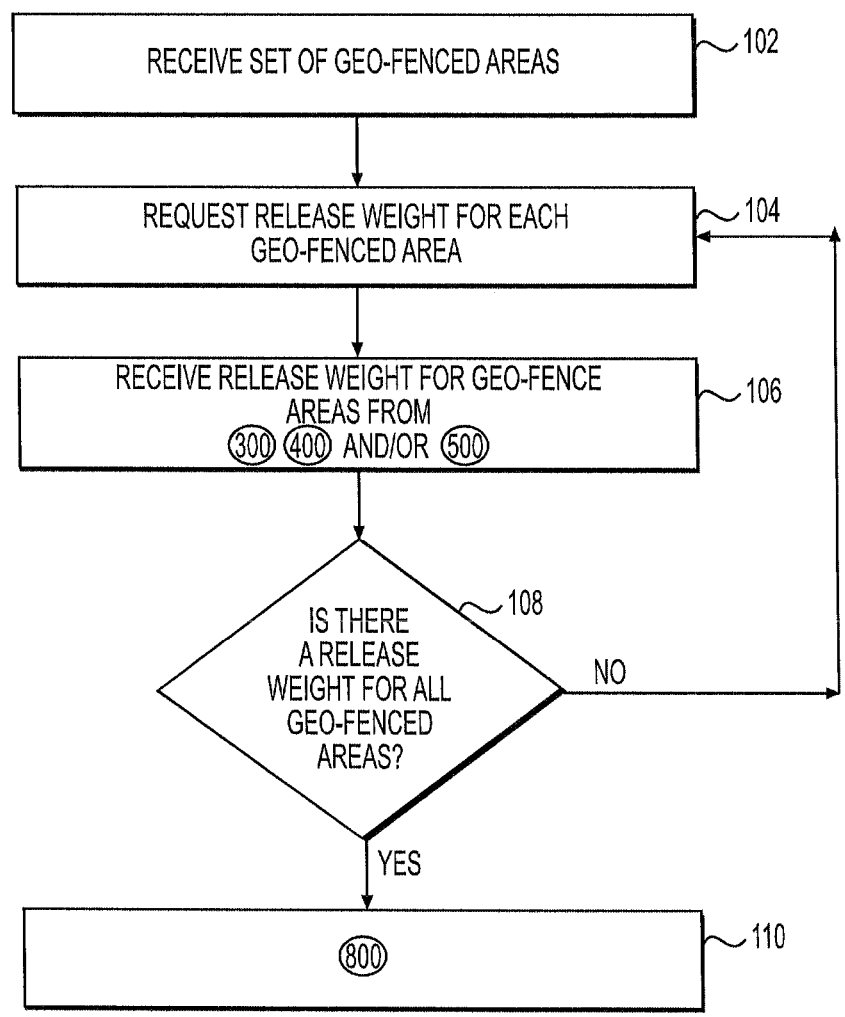
FIG. 1 is a process flow diagram of an exemplary method for determining a release weight for a time and/or location, and optimizing the timing of message notifications for a mobile device user based on the release weight.

The present disclosure involves optimizing the timing of message notifications for a mobile device user based on a release weight associated with the current time and current geographic location of the user's device. Message notifications can be used to entice users to open or execute a client application. For the purpose of this disclosure, message notification may also refer to SMS messages, emails, or any other method of communicating with the mobile device user. The chance that a user will actually open or execute a client application, such as a browser, when a message notification is provided to the user's mobile device is not always high. Hence, these message notifications may sometimes fail to entice the user to open a client application or browser because they are sent when the user is in a place and/or a time when he/she is unlikely to do so. Conventional solutions do not provide a means of maximizing the odds that a user will open a client application based on 1) generalized factors, 2) factors individualized for a particular mobile device user, and/or 3) real-time factors.

The present disclosure is directed to overcoming one or more of the above referenced issues. Specifically, the present disclosure optimizes the timing of message notifications for a mobile device user based on a release weight associated with the current time and/or current geographic location of the user's device, wherein a release weight for a time and/or location may be random, as set by any party, and/or based on 1) generalized factors, 2) factors individualized for a particular mobile device user, and/or 3) real-time factors currently effecting the likelihood a client application will be launch.

Targeted content is typically displayed within a designated portion of the client application's own graphical user interface ("GUI") as it executes at the user's device, e.g., a banner advertisement presented in a bottom or top portion of the application's GUI (e.g., of a mobile browser). The targeted content is traditionally delivered to the user's device only when the client application is actively executing at the device, e.g., after the user has manually launched the application for execution via a user interface of the operating system at the mobile device. The user, however, will not always open a client application at the time a message notification is sent. As explained in further detail below, by sending a message notification to a user, a user can be enticed to manually launch the application associated with the message notification and thereby allow the delivery of targeted content to the user at a convenient and/or effective time.

The techniques disclosed herein may be used to determine where and when there is an increased likelihood that the user will launch the client application upon receipt of a notification and thereby, allow targeted content to be delivered to the user's mobile device.

Geographic locations and/or times may be assigned a release weight. The release weight may be determined, modified, and/or refined based on any formulas or factors. Some factors may indicate the need to decrease the release weight, indicating there is a lower likelihood a user will launch a client application. Alternatively, some factors may indicate the need to increase the release weight, indicating there is a higher likelihood a user will launch a client application. These factors may involve the advertiser, service provider, etc. deciding the release weight is too high or too low. In more sophisticated examples, the release weight may be based on (1) generalized factors (as in FIG. 3), (2) factors individualized for a particular mobile device user (as in FIG. 4), and/or (3) real-time factors (as in FIG. 5) currently effecting the likelihood a client application will be launch.

The service provider, advertiser, and/or application provider may determine how the release weights are measured. An initial release weight may be set so that it is lower than any initial message weight, as further described below. The release weight may be, but is not limited to, a rating (−5 to 5), a grade (A-F), or price ($1 per message). The factors used to adjust the release weights may be weighted equally or discretely. For example, an advertiser may set all general factors to modify a release weight by $1, all user-specific factors to modify a release weight by $5, and one real-time to modify by $2 while second real-time factor modifies it by $3. In some cases, each factor may adjust the release weight, or in others, the release weight may not be adjusted until minimum number of factors is reached, or only a maximum number of factors may adjust the release weight. For example, the release weight may decrease for every factor indicating a need to decrease, the release weight may be increased only three times regardless of how many factors indicate a need to increase, or the release weight may not increase until there are at least six factors indicating a need to increase.

In some embodiments, the release weight has only two states. In these embodiments, the release weight may be defined to either "send" or "don't send" a message. For example, typically, users do not launch a client application from 1:00 AM to 4:00 AM in industrial parks. During these times, in industrial parks, the release weight may be initially set so that no message notifications are sent to any phone. However, when performing further refinements, based on user-specific factors, it is determined that three particular users (e.g. the third shift workers) do launch client applications during this time in a particular industrial park. For those three mobile devices, the release weight may be set to the send environment and any message notification received by one of these mobile devices when it is located in the geo-fence covering the industrial park will be sent to the mobile device for display to the user.

The timing of the message notification can be controlled by queuing message notifications associated with a client application. The delivery of the message notification to the user's mobile device can then be delayed for a predetermined period of time, until a desired time, or until the current geographic location of the user's mobile device is determined to be within a geographic area and/or at a time in which there is an increased likelihood that a client application may be launched. When the message notification is eventually delivered to the user's mobile device and displayed within a general notifications window of the operating system's GUI at the device, the user may be more inclined to open the corresponding client application after viewing the message notification. In other words, the user may be more likely to launch the client application corresponding to a message notification (e.g., a breaking news alert) displayed at the user's device after viewing the message notification.

In an example, an application developer or affiliated information service provider, e.g., a news agency or other media outlet, associated with a client application may provide a mobile messaging service, to which the user may subscribe so as to authorize the service provider to send (e.g., "push") real-time message notifications (e.g., breaking news or other alerts) to the user's device via a mobile communication network. The notifications sent by a service provider associated with a client application executable at the user's device may be displayed within a general notifications window of a GUI of the device's operating system, even when the corresponding client application may not have been launched by the user or be actively executing at the mobile device.

It may be assumed that the mobile device user in the above example may be relatively unaware of the third-party content provider. Thus, while a user who has subscribed to messaging services offered by a service provider associated with a client application executable at the user's device may have authorized the application service provider to send general message notifications (e.g., push notifications) related to topics of interest to the user's device, the user may not have explicitly requested third-party content providers to send targeted content to the user's device in the same way. However, it may also be assumed for purposes of this example that the user has at least implicitly requested or authorized third-party content providers (e.g., with whom the application service provider may have entered into a partnership agreement) to deliver targeted content to the user's mobile device within a designated portion of the application's GUI while the client application is actively executing at the user's device (e.g., pursuant to terms and conditions of use accepted by the user).

In the above example, an authorized third-party content provider may also use the client application to deliver targeted content to the user's mobile device. To increase the probability that the user will open a particular client application, the push-notification may be timed to coincide with times when and/or location where the user is more likely to open a client application.

In some embodiments, the mobile operating system may allow the user to launch the client application associated with a particular notification directly from the notification window by selecting the notification as it is displayed via the operating system GUI at the mobile device. Thus, the techniques disclosed herein may be used to optimize the timing of the message notification displayed at the user's device so as to increase the probability that the corresponding client application is launched, e.g., by enticing the user to launch the client application when it is inactive, after viewing the message notification.

Further, once a client application is opened or executed, the specific targeted content that is sent to the user's mobile device at a particular time may also be based on the current geographic location of the mobile device. The delivery of such geo-located content to the user's device may be triggered when, for example, the location of the user's mobile device is determined to be within a designated geographic area, e.g., covered by a geo-fence associated with the targeted content.

Each message notification may be assigned a message weight using any one of various priority schemes as desired for a particular implementation. Any scheme may be used alone or in combination. The message weight may be set by any party, including application developers, service providers, third-party content providers, advertisers, mobile device users, etc. The initial message weight may be set so that it is higher than the initial release weight. In some embodiments, all message notifications may be assigned the same message weight. In another implementation, a message weight may decrease (or a corresponding release weight may increase, thereby advancing the message toward eventual release/display) the longer the message remains in the message queue. This increase or decrease may be done incrementally or exponentially. In other embodiments, service providers, third-party content providers, and/or advertisers may set message weights. Service providers, third-party content providers, and/or advertisers may also set a price they are willing to pay for a message notification to be sent. A release weight may then either be, or correspond to, a monetary value. For example, a time and/or geographic location may have a release weight of $1 and if the message notification provider is willing to pay $1 for a particular message (i.e. a message weight greater than or equal to $1), the message notification may be sent to the user's mobile device. (Determining release weights will be described in greater detail below, with respect to FIGS. 1-5.) A mobile device user may also designate and/or effect message weights. For example, a user receiving notifications from a news agency, may "grade" or "weigh" different types of messages notifications, so that information the user is particularly interested in receiving (e.g., breaking news) has an "A" rating, while something the user has little interest (i.e., celebrity gossip) is given an "F" rating. The user's ratings may completely control a message weight or may be taken in account with other factors. Message notifications may also have an expiration time used to determine the maximum period of time that a message should be held in the message queue prior to being delivered to a user device, regardless of the message weight or release weight. It should be noted that the above are only examples of designating and/or determining a message weight, and this disclosure should not be limited thereto.

FIG. 1 is a process flow diagram of an exemplary method 100 for determining a release weight for a time and/or location and optimizing the timing of message notifications for a mobile device user based on the release weight.

Method 100 begins in step 102. Step 102 includes receiving a set of geo-fenced areas. These geo-fences may have been previously created or created in real-time to capture any a geographic areas desired by service providers, content providers, application providers and/or advertisers. For example, geo-fences created in the manner described in U.S. patent application Ser. No. 14/194,108 filed Feb. 28, 2014, U.S. patent application Ser. No. 14/283,932 filed May 21, 2014, and U.S. patent application Ser. No. 14/163,799 filed Jan. 24, 2014. In step 104, release weights are requested for each geo-fence area received in step 102. In step 106, release weights are received from performing methods 300, 400, and/or 500, as described below. Once a release weight is received, it will be determined in step 108 whether all geo-fenced areas received in step 102 have a release weight. If there is a release weight for all geo-fenced areas, method 100 will proceed to 110, and to step 802 of method 800 to optimize the timing of message notifications based on the release weight of the geo-fenced areas. If, in step 108, it is determined that there is not a release weight for all geo-fenced areas received in step 102, method 100 will return to step 104.

Figure 2:
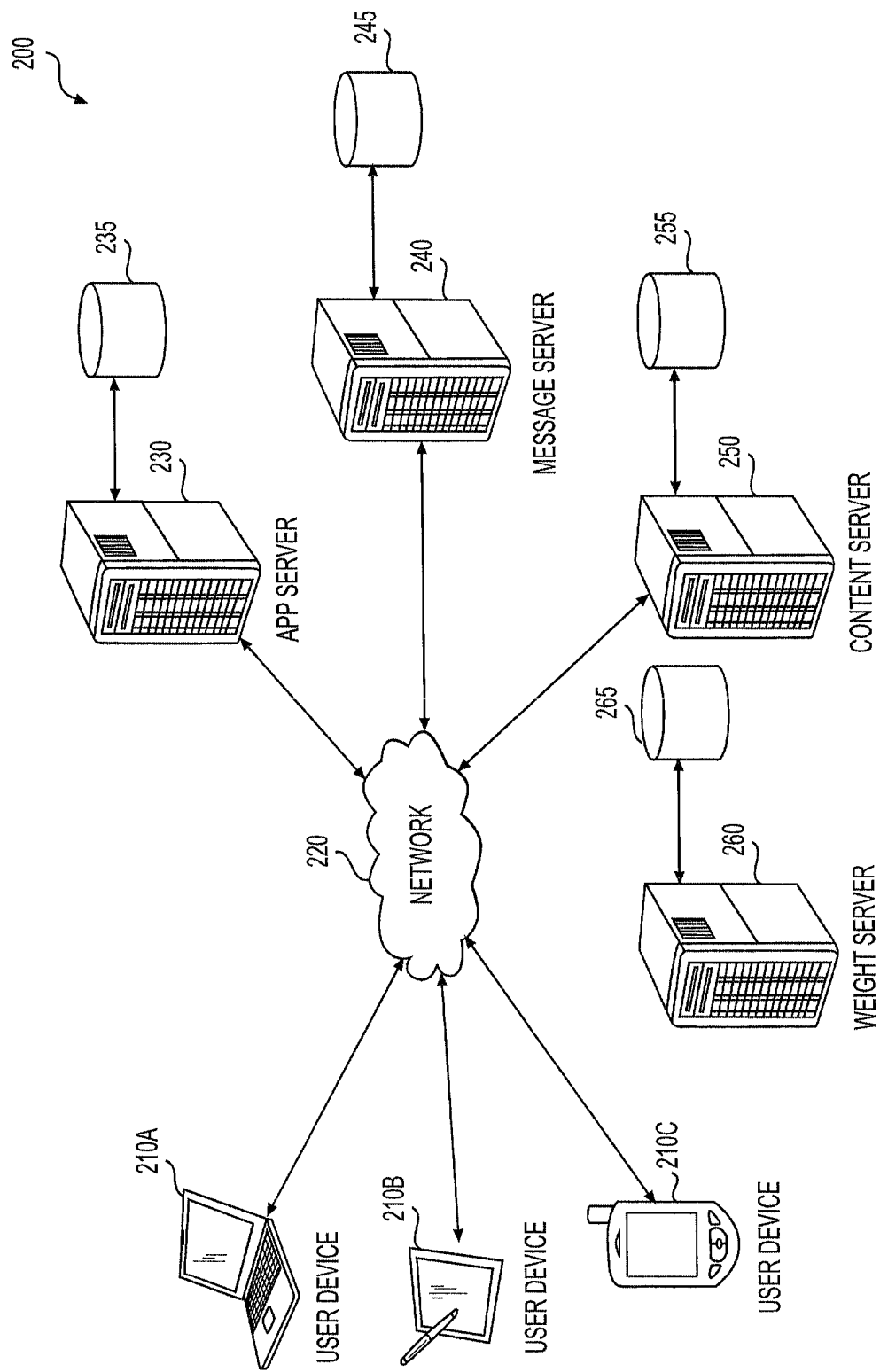
FIG. 2 is a block diagram of an exemplary communication system suitable for practicing an embodiment of the present disclosure.

FIG. 2 is a block diagram of an exemplary communication system 200 for practicing embodiments of the present disclosure. As shown in FIG. 2, system 200 includes user devices 210a, 210b, and 210c, an application server 230 coupled to a database 235, a message server 240 coupled to a database 245, a content server 250 coupled to a database 255, and a weight server 260 coupled to a database 265, all of which may be communicatively coupled via an electronic communication network 220.

Network 220 may be any type of electronic network or combination of networks used for communicating digital content and data between various computing devices. Network 220 may include, for example, a local area network, a medium area network, or a wide area network, such as the Internet. While only user devices 210a, 210b, and 210c are shown in FIG. 2, system 200 may include any number of user devices. Similarly, while only application server 230, message server 240, content server 250, and weight server 260 are shown in FIG. 2, it should be understood that system 200 may include additional or fewer servers, as desired for a particular implementation. Further, while not shown in FIG. 2, network 220 may include various switches, routers, gateways, or other types of network devices used to facilitate communication between various computing devices via network 220.

In the example shown in FIG. 2, user device 210a may be a laptop, notebook, netbook, or similar type of mobile computing device. User device 210b may be, for example, a tablet device or similar type of mobile device having a touchscreen display. User device 210c may be, for example, a mobile handset, smartphone, or personal digital assistant ("PDA"). However, it should be noted that each of user devices 210a, 210b, and 210c may be any type of mobile computing device configured to send and receive different types of data including, but not limited to, website data, multimedia content, electronic advertisements, and any other type of digital information, over network 220. Examples of such mobile computing devices include, but are not limited to, a laptop computer, a handheld computer, a personal digital assistant (PDA), a cellular telephone, a network appliance, a camera, a smart phone, an enhanced general packet radio service (EGPRS) mobile phone, a media player, a navigation device, a portable game console, or any combination of these computing devices or other types of mobile computing devices having at least one processor, a local memory, a display, one or more user input devices, and a network communication interface. The user input device(s) may include any type or combination of input/output devices, such as a display monitor, touchpad, touchscreen, microphone, camera, keyboard, and/or mouse.

Each of application server 230, message server 240, content server 250, and weight server 260 may be any of various types of servers including, but not limited to, a web server, a proxy server, a network server, or other type of server configured to exchange electronic information with other servers or computing devices via a communication network, e.g., network 220. Such a server may be implemented using any general-purpose computer capable of serving data to other computing devices including, but not limited to, user devices 210a, 210b, and 210c or any other computing device (not shown) via network 220. Such a server may include, for example and without limitation, a processor and memory for executing and storing processor-readable instructions. The memory may include any type of random access memory (RAM) or read-only memory (ROM) embodied in a physical storage medium, such as magnetic storage including floppy disk, hard disk, or magnetic tape; semiconductor storage such as solid state disk (SSD) or flash memory; optical disc storage; or magneto-optical disc storage. Software may include one or more applications and an operating system. Hardware can include, but is not limited to, a processor, memory and graphical user interface display. The server may also be implemented using multiple processors and multiple shared or separate memory devices within, for example, a clustered computing environment or server farm.

Also, as shown in FIG. 2, application server 230, message server 240, content server 250, and weight server 260 are communicatively coupled to databases 235, 245, 255, and 265, respectively. Each of databases 235, 245, 255, and 265 may be a data store or memory accessible to the corresponding server and may be implemented using any type of data storage device or recording medium used to store various kinds of data or content. Such data or content may include, for example and without limitation, text or media content that may be later provided to each of user devices 210a, 210b, and 210c via network 220.

In an example, each of user devices 210a, 210b, and 210c may execute a client application that communicates with application server 230, message server 240, content server 250, and weight server 260 via network 220. Further, each of user devices 210a, 210b and 210c may be configured to receive application content through an interface provided by application server 230 via network 220. The content provided by application server 230 may be based on, for example, user requests initiated via a GUI of the client application executable at each device. The GUI of the client application executable at each of user devices 210a, 210b, and 210c may be configured to present the content to a user at each device via a display of the respective user devices 210a, 210b, and 210c. The GUI of the client application may include, for example, various control elements enabling the user to request various types of content, e.g., which may be associated with a web site maintained by the application service provide. Further, a portion of the GUI of the client application may serve as a content view area used to display content (e.g., electronic advertisements) from a third-party content provider associated with content server 250. Such a content view of the client application may be a dedicated content area, e.g., displayed at the very top or bottom portion, of the application's GUI. As described above, such third-party content, e.g., as provided by content server 250 via network 220, may be displayed within the content view of the client application when the client application is actively executing at user device 210a, 210b, or 210c. Also, as described above, such third-party content may be different from the messages sent by an application provider for display to the user via a general message notifications interface of the operating system at user device 210a, 210b, or 210c, even when the client application is dormant or not actively executing at the particular device.

Application server 230 may be configured to host a web service that provides users various types of functionality via a GUI of the client application executable at each of user devices 210a, 210b, and 210c. Such functionality may include, for example and without limitation, providing digital content distributed by an application service provider associated with the client application. The application service provider may be, for example, an online content provider, including those associated with various search engines, e-mail programs, RSS feed providers, magazines, e-zines, blogs, or any other online site or program that publishes or distributes online content related to, for example, news or various topics of general public interest. As described above, a functionality provided by such an application service provider may include sending messages, e.g., push notifications, related to topics of interest, as specified by a user/subscriber of each user device. Also, as described above, the messages sent to each device may be displayed for the user via a message notifications interface of a mobile operating system at each of user devices 210a, 210b, and 210c if, for example, the client application has not been launched by the user or is not actively executing at the user's device.

Further, application server 230 and message server 240 may be configured to communicate with content server 250 or one or more other third-party content servers (not shown) to retrieve content (e.g., electronic advertisements) via network 220 to be displayed within a content view of a client application executable at each of user devices 210a, 210b, and 210c. Further, application server 230, message server 240, content server 250, and weight server 260 may each interact with one another, user devices 210a, 210b, or 210c, or any other servers or network devices (not shown) via network 220. Examples of such other servers include, but are not limited to, DNS servers, ad servers, and content distribution servers.

Message server 240 in this example may be configured to control the timing of messages or push notifications to be sent via network 220 to each of user devices 210a, 210b, and 210c based on the release weight for the current time and/or the current geographic location of each device. In an example, message server 240 may delay the sending of a message when the release weight of current geographic location of the device is determined to be greater than the message weight. As will be described in further detail below, message server 240 may add the message to a message queue for the client application. Message server 240 may be configured to send the message from the message queue to user device 210a, 210b, or 210c via network 220, upon receiving an indication of an updated time and/or updated current geographic location of the device and determining that the new or updated time and/or location corresponds to a release weight lower than or equal to a message weight.

In an example, message server 240 may communicate with content server 250 to determine whether the release weight of the current time and/or the current geographic location of user device 210a, 210b, or 210c exceeds the message weight, as described above and as will be described in further detail below. Content server 250 may be configured to receive a request including the current geographic location of user device 210a, 210b, or 210c from message server 240 and send appropriate targeted content to message server 240 after determining whether the release weight exceeds the message weight.

In some embodiments, message server 240 may be implemented as a back-end component that interfaces with only application server 230, content server 250, and weight server 260. Thus, it should be noted that for some embodiments, message server 240 may be configured to act as an intermediary between application server 230 and content server 250 or application server 230 and weight server 260, without any direct communication with any of user devices 210a, 210b, or 210c, in order to facilitate the message notification timing functionality described herein. Accordingly, application server 230, message server 240, content server 250, and weight server 260 may be configured to exchange information in the form of messages, requests, or responses that are passed between the servers. The communication between application server 230, message server 240, content server 250, and weight server 260 may be over network 220 or a virtual private network accessible to each server. In an example, messages added to the message queue may be routed from message server 240 to application server 230, when it is determined that the release weight for the current time and/or the current location of user device 210a, 210b, or 210c exceeds the message weight. Application server 230 may then send the routed message to user device 210a, 210b, or 210c via network 220. However, it should be noted that the functions performed by application server 230, message server 240, content server 250, weight server 260, or any combination thereof, as described herein, may be implemented using a single server. Additional features and characteristics of the communication between user devices 210a, 210b, and 210c, application server 230, message server 240, content server 250, and weight server 260 will be described in further detail below with respect to FIGS. 6 and 7.

A. Determining the Release Weight

Figure 3:
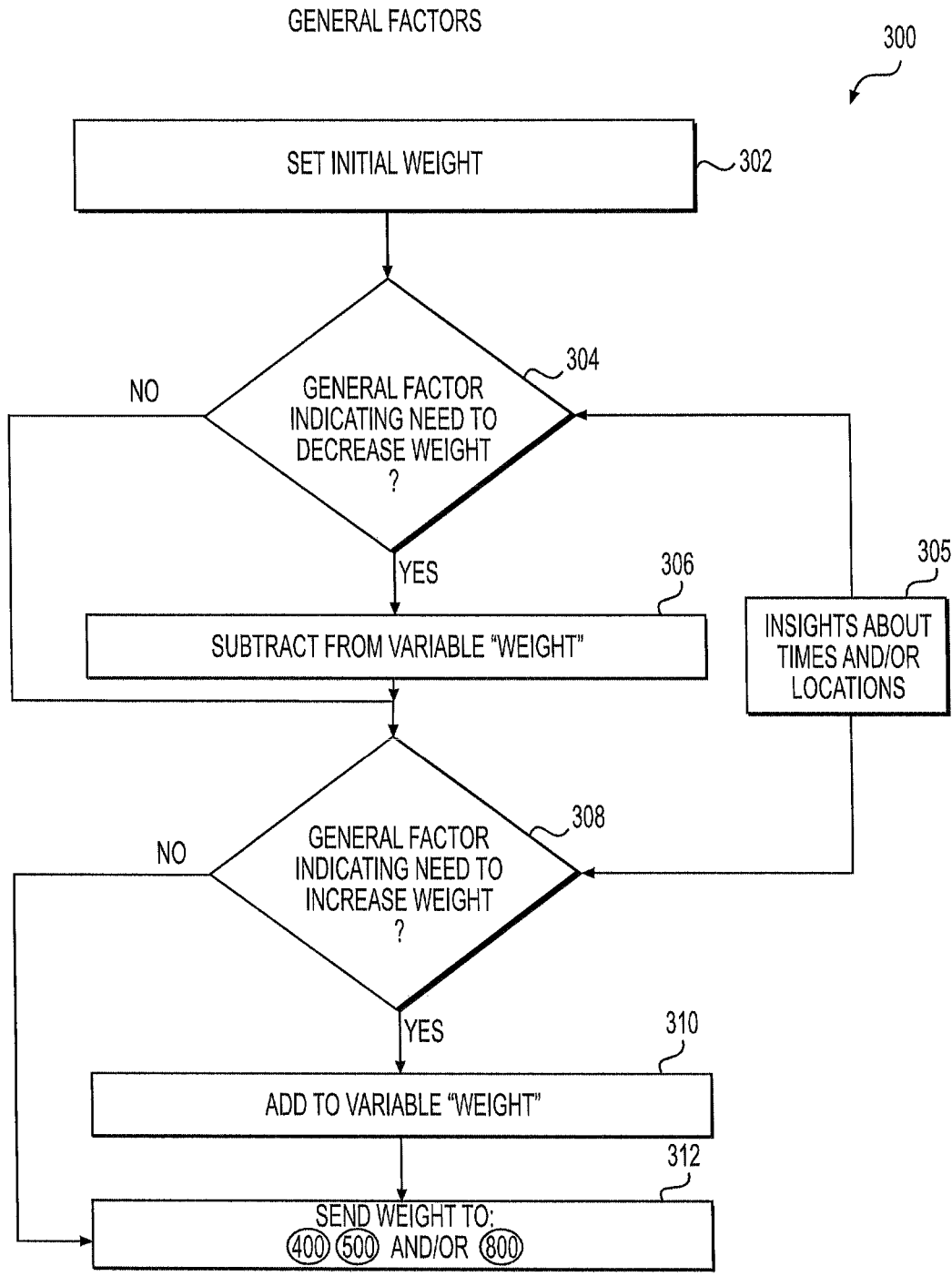
FIGS. 3, 4, and 5 are block diagrams of exemplary processes for determining a release weight associated with a time and/or geographic location.
Figure 4:
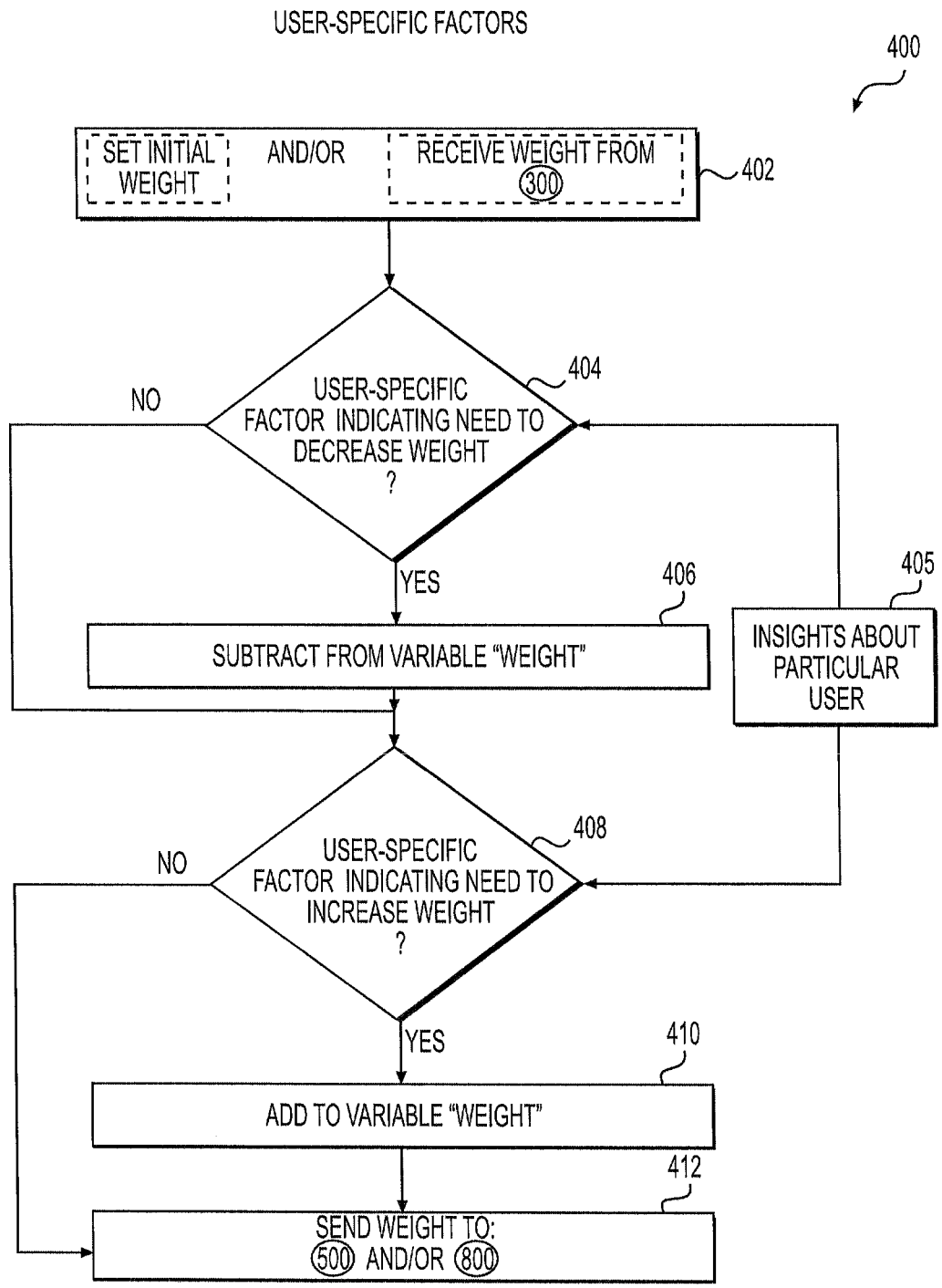
Figure 5:
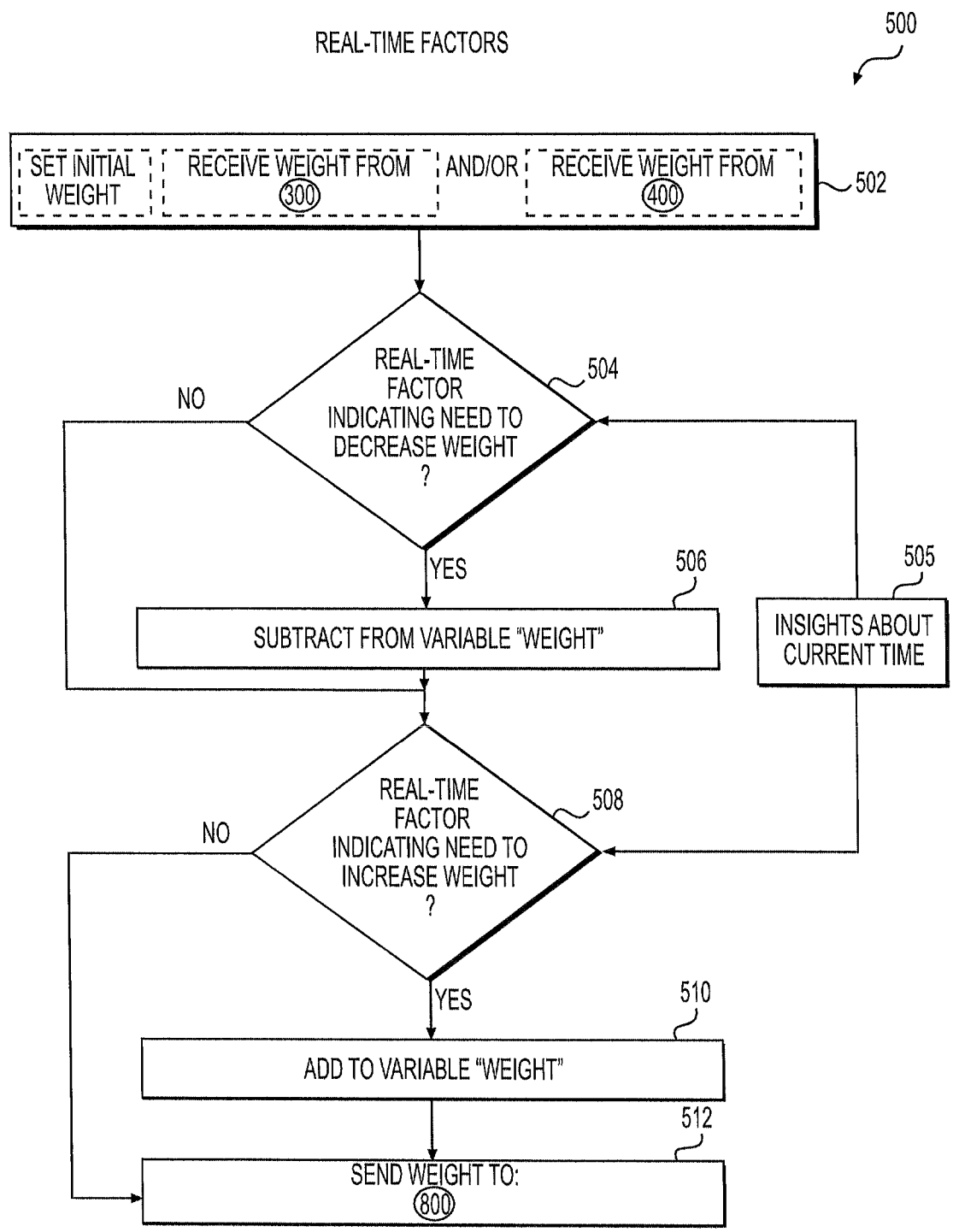

FIGS. 3-5 are process flow diagrams of exemplary methods 300, 400, and 500 for determining a release weight for a time and/or location. Methods 300, 400, and 500 may be used to determine a release weight alone or in series. A release weight may be limited to a time parameter, a location parameter, or it may encompass both. Release weights may be set for a number of locations, including but not limited to, all geographic locations, certain geographic areas, all previously created geo-fences, and/or a subset of geo-fences. Methods 300, 400, and 500 will be described using system 200 of FIG. 2, as described above, for discussion purposes only, but methods 300, 400, and 500 are not intended to be limited thereto. In an example, the steps of methods 300, 400, and 500 may be executed by weight server 250 of FIG. 2, as described above. However, methods 300, 400, and 500 are not intended to be limited thereto, and the steps of methods 300, 400, and 500 may be performed by any server (e.g., application server 230 of FIG. 2) or other type of computing device having at least one processor, a memory, and a network communication interface for sending and receiving information from one or more mobile devices.

1. General Factors

Release weights may be determined based on general factors, in which all user activity may be generalized or assumed. General factors indicating a need to decrease the release weight may include anything that, in general, (or statistically, typically, historically, etc.) indicates that a user is unlikely (or less likely) to launch a client application. Whereas, general factors indicating a need to increase the release weight may include anything that, in general, (or statistically) indicates that a user is more likely to launch a client application. Exemplary general factors are described below, for discussion purposes only, but this disclosure and, in particular method 300, are not intended to be limited thereto.

One example of a general factor is a historic number of client applications opened, a level of content consumption of mobile devices, and/or a level of content creation by mobile devices during a specific time in a geographic area. If the historic number of client applications opened, or a level of content consumption and/or creation is below a weight, this may be a real-time factor indicating the need to decrease the release weight, as it may be assumed that since users have not accessed their mobile device in that location at that time in the past, they may be less likely to launch a client application during that same time and/or location, as described in further detailed U.S. patent application Ser. No. 14/194,108 filed Feb. 28, 2014. Additionally or alternatively, it may be assumed that users may be more likely to launch a client application in a location in which other users have historically opened client applications, consumed content and/or created content. Therefore, these time and such geographic locations may have a general factor indicating the need to increase the release weight.

In another implementation, assumptions could be made (or statistical analysis could show) about geographic locations or times-of-day/days of week. For example, it may be assumed that users are unlikely to open client applications in hospitals, funeral homes, and elementary schools. If a geographic location is associated with one of these, it may have a general factor that indicates the release weight should be decreased. Conversely, if a geographic location is associated with airports, commuter rail stations, and shopping malls, it may have a general factor that indicates the need to increase the release weight. In another example, a time & date may be used to adjust a release weight. "Off peak" hours, a high school from 7:00 AM-5:00 PM Monday-Friday, for example, may need its release weight decreased because students and teachers are not permitted to use their phones during the day. However, the release weight may need to be increased again, starting at 5:00 PM, because a parent may be bored (and more likely to open a client application) because they are waiting for their child's practice to end.

FIG. 3 is a process flow diagram of an exemplary method 300 for determining and/or adjusting a release weight for a time and/or location based on general factors. Method 300 begins in step 302, in which the variable "Weight" is defined. This may be an initial weight set by the service provider, content provider, and/or advertiser or selected at random. Method 300 then proceeds to step 304, which includes determining whether there are any general factors indicating the need to decrease the release weight, as described above. If it is determined that there is a factor indicating the need to decrease the release weight, method 300 proceeds to step 306, which subtracts from the variable "Weight." A general factor indicating the need to decrease the release weight may be any insight about times and/or locations, including, but not limited to those described above. Once step 306 is complete or, if in step 304, it is determined that there is not a factor indicating the need to decrease the release weight, method 300 proceeds to step 308 to determine whether or not there are any factors indicating the need to increase the release weight, as described above. A general factor indicating the need to increase the release weight may be any insight about times and/or locations, including, but not limited to those described above. If it is determined that there are any factors indicating the need to increase the release weight, method 300 proceeds to step 310, which adds to the variable "Weight" and then proceeds to step 312. If it is determined in step 308 that there are no general factors indicating the need to increase the release weight, method 300 proceeds to step 312, and sends the variable "Weight" to weight server 260, step 402 of method 400, step 502 of method 500, and/or step 802 of method 800.

2. User-Specific Factors

In a further refinement, factors related to an individual mobile device, the demographics of a user associated with that device, and/or its user may be utilized to determine, modify, or refine the release weight for a particular time and/or location. User-specific factors indicating a need to decrease the release weight may include anything that indicated the user of a particular mobile device is unlikely (or less likely) to launch a client application. Whereas, user-specific factors indicating a need to increase the release weight may include anything indicates that a particular user is more likely to launch a client application.

One example of a user-specific factor is the time and/or geographic area a user launches a client application, activates an advertisement from within a client application, launches the client application associated with the message notification, launches a client application after receiving a message notification, and/or engages at all with the mobile device. If the user interaction with the mobile device is below a weight, this may be a user-specific factor indicating the need to decrease the release weight, as it may be assumed that the user may be less likely to launch a client application in a location in which he/she has historically failed to do so. For example, if a user has never opened a client application a first geographic location between 9:00 and 11:30 AM, this may indicate a need to decrease the release weight for the first geographic location during those hours. Additionally or alternatively, it may be assumed that users may be more likely to launch a client application in a location in which he/she has repeatedly done so in the past, and such time and geographic locations may be a user-specific factor indicating the need to increase the release weight. For example, if the user in the above example launches a client application from 90% of message notifications sent to him/her at the first geographic location between 11:30 AM and 1:00 PM, this may indicate a need to increase the time parameter of the release weight for that geographic location between 11:30 AM and 1:00 PM.

In another implementation, a user could be periodically asked for direct feedback. For example, the user may be prompted "are you at work?" or, "are you at home?" If the user indicates that he/she is at work, this may be a factor indicating that the location parameter of the release weight needs to be decreased. If the user indicates that he/she is at home, this may be a factor indicating that the location parameter of the release weight needs to be increased. In some implementations, the user may be asked, "do you want to receive push notifications in this location?" A positive response would indicate a need for an increase, while a negative response would be a user-specific factor indicating a need for a decrease.

FIG. 4 is a process flow diagram of an exemplary method 400 for determining and/or adjusting a release weight for a time and/or location based on such user-specific factors. Method 400 begins in step 402, in which the variable "Weight" is defined. This may be received from methods 300, as described above. Additionally or alternatively, an initial weight may be set by the service provider, content provider, and/or advertiser or selected at random. Method 400 then proceeds to step 404, which includes determining whether there are any user-specific factors indicating the need to decrease the release weight, as described above. A user-specific factor indicating the need to decrease the release weight may be any insight about a particular user, including, but not limited to those described above. If it is determined that there is a user-specific factor indicating the need to decrease the release weight, method 400 proceeds to step 406, which subtracts from the variable "Weight." Once step 406 is complete or, if in step 404, it is determined that there are no user-specific factors indicating the need to decrease the promotion, method 400 proceeds to step 408 to determine whether there are any user-specific factors indicating the need to increase the release weight, as described above. A user-specific factor indicating the need to increase the release weight may be any insight about a particular user, including, but not limited to those described above. If it is determined that there are any user-specific factors indicating the need to increase the release weight, method 400 proceeds to step 410, which adds to the variable "Weight" and then proceeds to step 412. If it is determined in step 408 that there are no user-specific factors indicating the need to increase the release weight, method 400 proceeds to step 412, and sends the variable "Weight" to weight server 260, step 502 of method 500 and/or to step 802 of method 800.

3. Real-Time Factors

In a further refinement, factors related to the current environment (i.e. real-time factors) may be utilized to determine, modify, or refine the release weight for a particular time and/or location. Real-time factors indicating a need to decrease the release weight, may include anything that is currently or recently occurred to indicate that a user is unlikely (or less likely) to launch a client application. Whereas, real-time factors indicating a need to increase the release weight may include anything that is currently occurring, or that recently occurred, to indicate that a user is more likely to launch a client application. It should be appreciated that the terms current, real-time, or recent may encompass any amount of time suitable. For example, current mobile phone use for a geographic location may be use monitored within the last second or within the last year. Exemplary real-time factors are described below, for discussion purposes only, but this disclosure and, in particular method 500, are not intended to be limited thereto.

One example of a real-time factor is the level of content consumption and/or creation of mobile device in a geographic area. If the level of content consumption and/or creation is below a weight, this may be a real-time factor indicating the need to decrease the release weight, as it may be assumed that users may be less likely to launch a client application in a location in which other users are not currently consuming or creating content on their mobile devices, as described in further detailed U.S. patent application Ser. No. 14/283,932 filed May 21, 2014. Additionally or alternatively, it may be assumed that users may be more likely to launch a client application in a location in which other users are currently consuming and/or creating content on their mobile devices. As such, a geographic location having a weight level of content consumption and/or creation may be a real-time factor indicating the need to increase the release weight.

In another implementation, some changes in the location of a mobile device may be a real-time factor that indicates the need to increase or decrease the release weight. For example, by repeatedly updating the current geographic location of the mobile device, it can be determined if, and where, the mobile device is currently moving. This information can be used as a real-time factor to further optimize the timing of the message notifications. In some embodiments, if it is determined that the mobile device is not moving, this may indicate that the user is more likely to launch a client application, and thus indicate a need to increase the release weight. This implementation can be further limited based on the above described "user-specific factors", so, for example, the release weight is only increased if the mobile device is 1) not in motion and 2) also in a location associated with the user's home or office or if the mobile device is 1) not in motion and 2) in a location the user historically launches the client application associated with the message notification. Conversely, a real-time factor associated with changes in the mobile device's location may indicate a need to decrease the release weight. For example, the release weight may need to be decrease if it is determined that the mobile device is moving. It may be assumed from the fact that the mobile device is moving that the user is driving and less likely to launch a client application. Or, in another example, the release weight may need to be decreased when the mobile device is in motion and moving along a known highway and/or currently executing a client application associated with maps or directions. In the alternative, if the movement of the user's mobile device emulates a known route for public transportation (i.e. metro lines, bus routes, etc.), it may be assumed that the user is likely to open a client application and this real-time factor would indicate a need increase the release weight.

The above implementation may further be refined so that if it is determined that the mobile device is moving, the velocity may also be determined. If the velocity of which the mobile device is moving is above a weight, it may be assumed that the mobile device is travelling in a car, on a train, or in the air. This may be a real-time factor indicating a need to decrease the release weight, as the user may be unlikely to open a client application in such situations. Further, assumptions could be made to determine which mode of transportation the mobile device is travelling on. For example, if the velocity is above a second, higher weight, it may be assumed the mobile device is travelling by air. Known routes of trains may also be utilized, and if the mobile device is tracked moving along a known train route, it may be assumed that the user is bored and therefore, likely to open a client application. Such a situation would indicate a need to increase the release weight. Known roads may be used in a similar manner to determine if a device is moving along a highway. Similarly, assumptions based on historic velocity of other users can be utilized. For example, geo-fences may be created around high-density, high-velocity areas and it may be deduced that these geo-fences contain highway intersections. If it is determined and/or assumed that the mobile device is moving along a highway, this may be a real-time factor indicating a need to decrease the release weight. This real-time factor may also be combined with direct feedback, as described above. For example, if the mobile device is determined to be travelling along a highway, a user may be asked if they are a driver or a passage. If the user responses that he/she is the driver, this may indicate a need to decrease the release weight. However, if the user responses that he/she is a passenger, he/she may be bored and more likely to open a client application. Thus, the release weight may need to be increased.

Method 500 is a process flow diagram of an exemplary method 500 for determining and/or adjusting a release weight for a time and/or location based on real-time factors. Method 500 begins in step 502, in which the variable "Weight" is defined. This may be received from methods 300 and/or 400, as described above. Additionally or alternatively, an initial weight may be set by the service provider, content provider, and/or advertiser or selected at random. Method 500 then proceeds to step 504, which includes determining whether there are any real-time factors indicating the need to decrease the release weight, as described above. A real-time factor indicating the need to decrease the release weight may be any insight about the current time, including, but not limited to those described above. If it is determined that there are real-time factors indicating the need to decrease the release weight, method 500 proceeds to step 506, which subtracts from the variable "Weight." Once step 506 is complete or, if in step 504, it is determined that there are no real-time factors indicating the need to decrease the release weight, method 500 proceeds to step 508 to determine whether or not there are any factors indicating the need to increase the release weight, as described above. A real-time factor indicating the need to increase the release weight may be any insight about the current time, including, but not limited to those described above. If it is determined that there are any factors indicating the need to increase the release weight, method 500 proceeds to step 510, which adds to the variable "Weight" and then proceeds to step 512. If it is determined in step 508 that there are no real-time factors indicating the need to increase the release weight, method 500 proceeds to step 512, and sends the variable "Weight" to weight server 260 and/or to step 802 of method 800.

B. Timing Message Notifications Based on Release Weights

Figure 6:
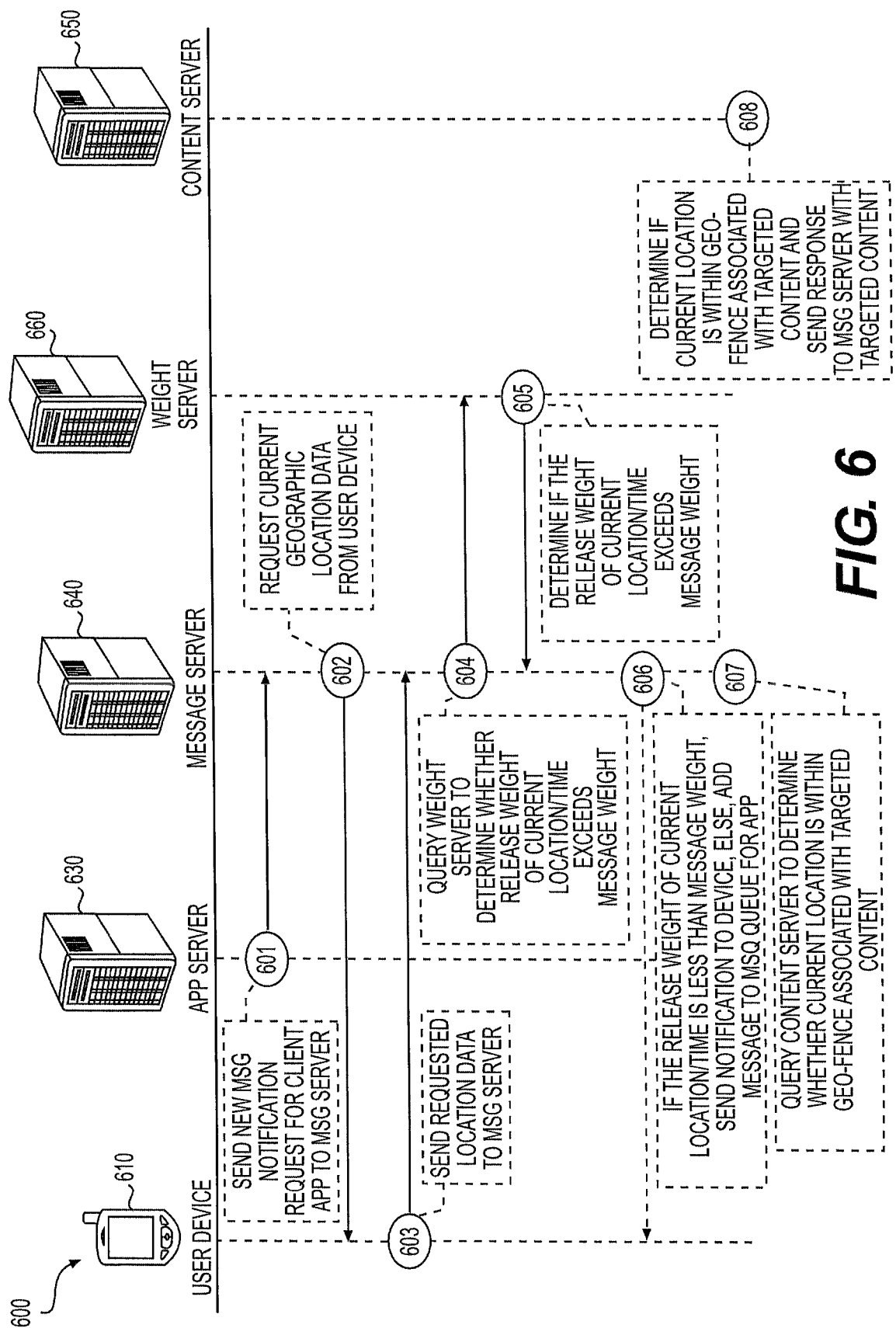
FIG. 6 is a communication flow diagram of an exemplary process for optimizing the timing of message notifications for a mobile device user based on a release weight associated with the current time and/or current geographic location of the user's device.

FIG. 6 is a communication flow diagram of an exemplary process 600 for optimizing the timing of message notifications for a mobile device user based on a current time and current geographic location of the user's device. The example shown in FIG. 6 illustrates the communication flow between a user device 610, an application server 630, a message server 640, a content server 650, and a weight server 660. For purposes of discussion, process 600 will be described using and system 200 of FIG. 2, as described above, but process 600 is not intended to be limited thereto. Thus, user device 610 may be implemented using, for example, any of user devices 210a, 210b, or 210c of FIG. 2, as described above. Similarly, application server 630, message server 640, content server 650, and weight server 660 may be implemented using, for example, application server 230, message server 240, content server 250, and weight server 260, respectively, as described above.

As shown in FIG. 6, application server 630 may send a new message notification request for a client application executable at user device 610 to message server 640 via a communication network, e.g., network 220 of FIG. 2, as described above (step 301). Message server 640 may in turn request a current geographic location of user device 610 (step 602). The request may be sent by message server 640 directly to user device 610, as shown in FIG. 6, or alternatively, message server 640 may send the request to application server 630, which may then request the geographic location information from user device 610, if necessary. In some embodiments, application server 630 may respond to the request from message server 640 by sending a last known or previously determined or estimated geographic location of user device 610, e.g., which may be stored in a memory or data store (e.g., database 235 of FIG. 2, as described above) coupled to application server 630. Accordingly, user device 610 may send the requested location data (or current geographic location information) to message server 640 (step 603), or to whichever server (e.g., application server 630) may have requested the information from user device 610.

Message server 640 may be configured to query weight server 660 to determine whether release weight of the current time and/or current geographic location of user device exceeds the message weight (step 304). The release weight of a particular time and/or geographic location may be determined by, for example, the methods described above in FIGS. 1, 3-5, in real-time by weight server 660 or previously determined and stored in database 665, coupled to weight server 660. If the release weight of the current time and/or current geographic location of user device current geographic location of user device 610 is determined (e.g., by app server 630) to exceed the message weight, message server 640 may send the message notification to user device 610 for display to the user at user device 610 via a general notifications interface of the operating system of user device 610, as described previously (step 606). Alternatively, if the release weight of the time or the device's location is determined to be less than the message weight, the message may be added to a message queue to be sent at a later time, as described above.

In other embodiments, the determination of whether the release weight of the time or the device's location exceeds or is less than or equal to the message weight may be performed by message server 640 itself, e.g., based on information specifying release weights for one or more times and/or geographic areas. Such information may be stored within a memory or data store (e.g., database 245 of FIG. 2) coupled to message server 640, as described above.

In some embodiments, the release weight is not a weight or a grade, but rather a simple send or do not send. In such embodiments, step 605 does not compare the release weight to the message weight. Rather, weight server 660 simply determines whether the release weight indicates a message should be sent. If the release weight indicates a message should be sent, message server 640 may send the message notification to user device 610 for display to the user at user device 610 via a general notifications interface of the operating system of user device 610 (step 606). Alternatively, if the release weight indicates a message should not be sent, the message may be added to a message queue to be sent at a later time.

It should be noted that in some embodiments, the message server 640 can also query the content server 650 (step 607) to determine whether the device's location corresponds to a geo-fence associated with targeted content. If the current geographic location of user device 610 is determined (e.g., by content server 650) to be within geo-fence associated with targeted content, content server 650 may provide the application server 630 with targeted content associated with that geo-fence to be displayed in the client application after said application has launched (step 609).

Figure 7:
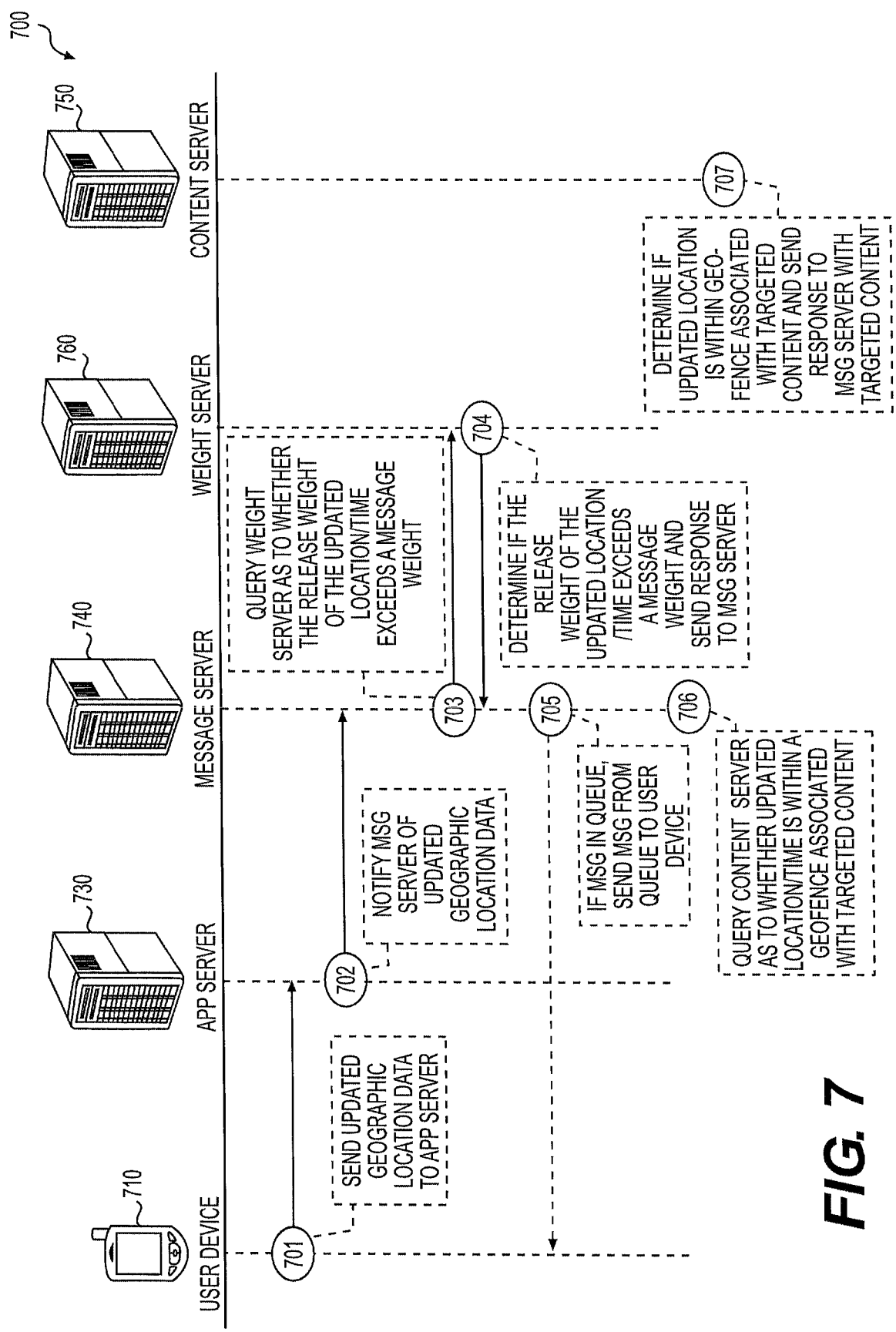
FIG. 7 is a communication flow diagram of an exemplary process for optimizing the timing of message notifications for the mobile device user of FIG. 6 based on a detected change in the current geographic location of the user's device.

FIG. 7 is a communication flow diagram of an exemplary process 700 for optimizing the timing of message notifications for the user of mobile device 610 of FIG. 6, as described above, based on a detected change in time and/or the current geographic location of the user's device. As shown in FIG. 7, the detected change location may be based on, for example, an updated current geographic location sent by user device 610 or an operating system thereof to application server 630 via a network, e.g., network 220 of FIG. 2, as described above (step 701).

Application server 630 may then notify message server 640 of the updated geographic location information received from user device 610 (step 702). Additionally or alternatively, weight server 660 may notify the message server 640 of an updated release weight based on the passage of time. In response to the notification from application server 630, message server 640 may query weight server 660 as to whether the release weight for the updated time and/or current location of user device 610 exceeds the message weight. (step 703). Additionally or alternatively, application server 630 or message server 640 may query the weight server 660 for an updated release weight automatically after a certain period of time has elapsed. The results of the determination may be sent in a response from weight server 660 to message server 640 (step 704). If the response from weight server 660 indicates that the release weight for an updated time and/or location exceeds the message weight of any pending message notifications within the queue, it may be determined that those messages should be sent to user device 610, e.g., as added previously by message server 640 (at step 606 of process 600 of FIG. 6, as described above). Message server 640 may send the message to user device 610 via a communication network, e.g., network 220 of FIG. 2 (step 705), for those messages within the message queue having message weights below the respective release weight.

If message server 640 in this example finds multiple messages with a release weight greater than the respective message weight within the message queue for the client application, message server 640 may be configured to select the appropriate message to send to user device 610 using any one of various priority schemes as desired for a particular implementation, for example, sending the message notification with the highest message weight. Other examples of such priority schemes include, but are not limited to, first-in-first-out (FIFO), last-in-first-out (LIFO), or an alternative scheme based on message priority. In an example, the priority scheme may be based on an expiration time associated with each message added to the message queue. The expiration time may be used to determine the maximum period of time that a message should be held in the message queue prior to being delivered to user device 610. In some embodiments, the expiration time may reflect a priority level and/or message weight assigned to the message, e.g., by the application service provider associated with the client application, as described above.

The message server 640 may also query the content server 650 as to whether the updated current location of user device 610 is within a geo-fence associated with targeted content (step 706). The results of the determination may be sent in a response from content server 650 to message server 640 (step 707). If the response from content server 650 indicates that the updated location is within a geo-fence associated with targeted content, the content server 650 can provide or the message server 640 may query the content server 650 for targeted content associated with the geo-fenced area. Content server 650 may send the targeted content to the application server 630 for delivery within any launched client application. If the response from content server 650 indicates that the updated location is not within a geo-fence associated with targeted content, the content server 650 provides any targeted content, regardless of its geographic association to application server 630 for delivery within any launched application.

Figure 8:
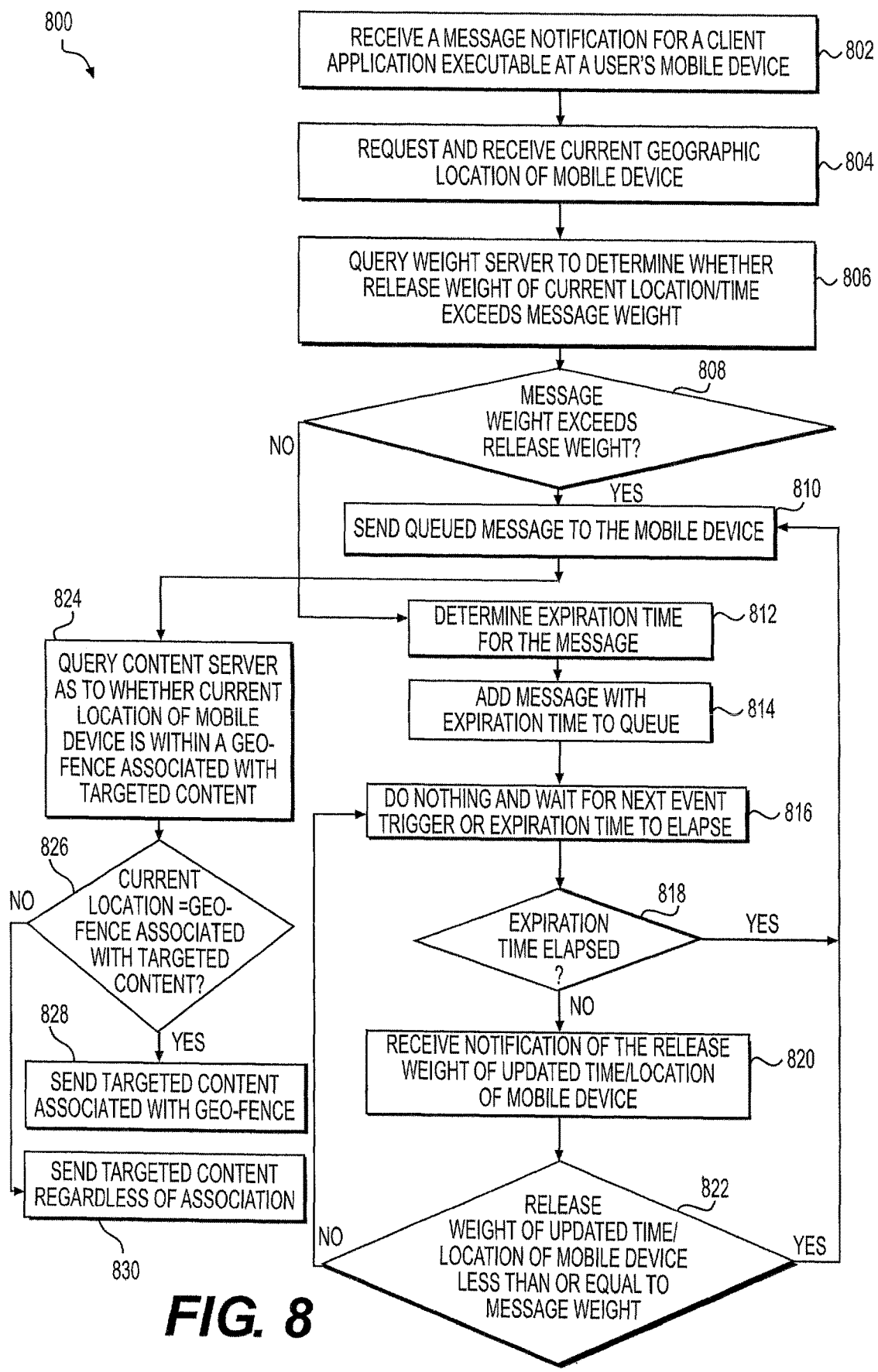
FIG. 8 is a process flow diagram of an exemplary method for optimizing the timing of message notifications for a mobile device user based on a release weight associated with the current time and/or current geographic location of the user's device.

FIG. 8 is a process flow diagram of an exemplary method 800 for optimizing the timing of message notifications for a mobile device user based on the current time and current geographic location of the user's device. For purposes of discussion, method 800 will be described using system 200 of FIG. 2 and the components of processes 600 and 700 of FIGS. 6 and 7 (including application server 630, message server 640, content server 650, and consumption tracking 660), as described above, but method 800 is not intended to be limited thereto. As shown in FIG. 8, method 800 includes steps 802, 804, 806, 808, 810, 812, 814, 816, 818, 820, 822, 824, 826, 828, and 830. However, it should be noted that method 800 may include more or fewer steps as desired for a particular implementation. In an example, one or more of the above-listed steps of method 800 may be executed by message server 240 of FIG. 2 or message server 640 of FIGS. 6 and 7, as described above. However, method 800 is not intended to be limited thereto, and the steps of method 800 may be performed by any server (e.g., application server 230 of FIG. 2 or application server 630 of FIGS. 6 and 6) or other type of computing device having at least one processor, a memory, and a network communication interface for sending and receiving information from one or more user devices.

Method 800 begins in step 802, which includes receiving a message notification for a client application executable at a user's mobile device (e.g., user device 210 of FIG. 2 or user device 610 of FIGS. 6 and 7, as described above). In step 804, a current geographic location of the mobile device is requested and received from the mobile device. Steps 806 and 808 may include, for example, determining whether the release weight is greater than or equal to the message weight of the current time or current geographic location of the mobile device. In some embodiments, this determination may be based on a response received from querying a weight server (e.g., weight server 260 of FIG. 2 or weight server 660 of FIGS. 6 and 7) using the current time and/or the geographic location information received from the user's mobile device. If it is determined in step 808 that the release weight is greater than or equal to the message weight (step 808: Yes), method 800 may proceed to step 810, which includes sending a message from a message queue to the mobile device. It should be appreciated that in some embodiments, the release weight is not a weight or a grade, but rather a simple send or do not send. In such embodiments, the message may be sent or not sent regardless of what the message weight is (or even if it exists). Step 808 may not compare the release weight to the message weight. Rather, it may include determining whether the release weight indicates a message should be sent. If the release weight indicates a message should be sent, method 800 may proceed to step 810. Alternatively, if the release weight indicates a message should not be sent, method 800 may proceed to step 812.

Once the message has been sent, method 800 may proceed to steps 824 and 826. Steps 824 and 826 may include, for example, determining whether a current geographic location of the mobile device is within a geo-fence associated with targeted content. In some embodiments, this determination may be based on a response received from querying a content server (e.g., content server 250 of FIG. 2 or content server 650 of FIGS. 6 and 7) using the geographic location information received from the user's mobile device. If it is determined in step 826 that the current geographic location of the mobile device is within a geo-fence associated with targeted content, method 800 may proceed to step 828, which includes retrieving targeted content associated with the geo-fence from the content server. If it is determined in step 826 that the current geographic location of the mobile device is not within a geo-fence associated with targeted content, method 800 may proceed to step 830, which includes retrieving targeted content from the content server regardless of whether or not the targeted content is associated with a geo-fence.

However, if it is determined in step 808 that the message weight is less than the release weight (step 808: No), method 800 may proceed to step 812, which includes determining or calculating an expiration time associated with the message. In an example, the expiration time for a message may be based on a priority level assigned to the message, e.g., by an application service provider associated with the client application, as described above. Thus, a message having a relatively higher priority level may be assigned a relatively shorter expiration time, e.g., starting from the time that the message was added to the queue. In step 814, the message is added with the expiration time to the appropriate message queue. Method 800 then proceeds to step 816, which includes waiting for a predetermined event to be triggered or the expiration time of the message to elapse. An example of such a predetermined event includes, but is not limited to, receiving a notification of an updated or detected change in current geographic location for the mobile device.

If it is determined in step 818 that the expiration time for the message has elapsed, method 800 proceeds to step 810, in which the message is sent from the message queue to the user's mobile device. Otherwise, method 800 proceeds to step 820, which may include receiving a notification of an updated time and/or updated geographic location of the mobile device, e.g., a type of predetermined event trigger described above with respect to step 816. In step 822, it is determined whether the message weight is greater than or equal to the release weight for the updated time and/or updated geographic location of the mobile device.

Figure 9:
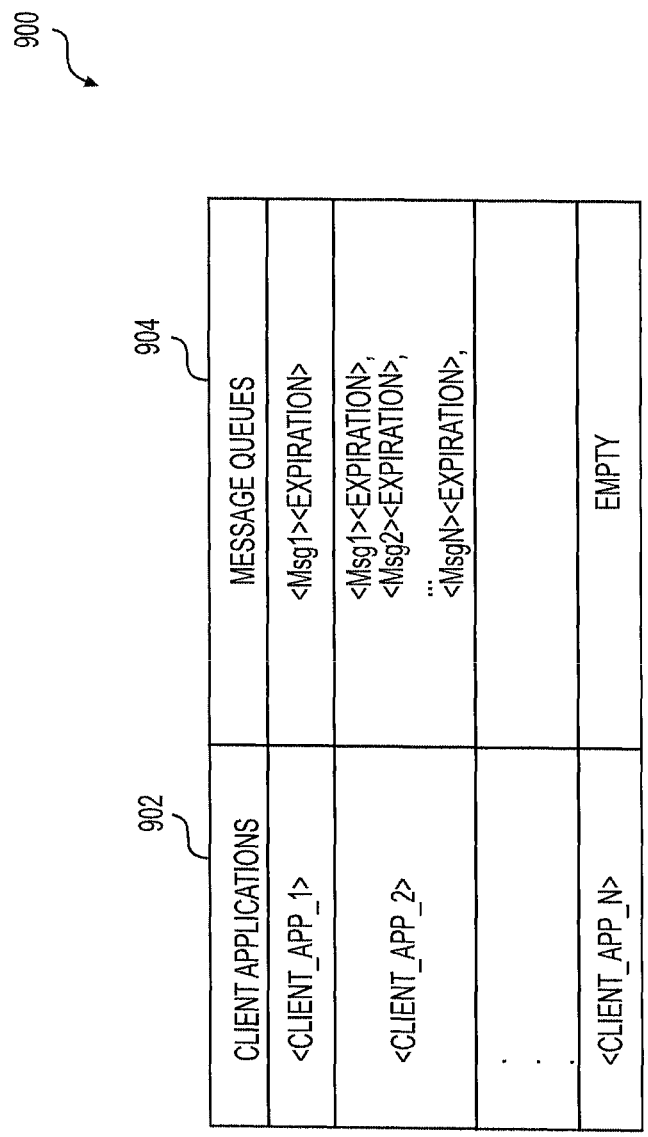
FIG. 9 is an exemplary table for associating different client applications with corresponding message queues.

It should be noted that step 810 may also include first checking the message queue to determine whether it includes any pending messages to be sent to the mobile device for the particular client application. The message queue in this example may be associated with the particular client application. In an example, an association between a queue of messages and a unique identifier associated with the client application may be maintained, e.g., by message server 240 of FIG. 2 or message server 640 of FIGS. 6 and 7, as described above. FIG. 9 shows an exemplary table 900 that may be used for associating different client applications, represented by corresponding client application identifiers 902 and their respective message queues 904. As shown in table 900, each message that is added to a message queue associated with a client application may include an expiration time used to determine the maximum amount of time that the message may be kept in the queue before being sent to the user's device, regardless of its current geographic location, as described above. Table 900 may be stored within a database (e.g., database 245 of FIG. 2) coupled to the server in this example.

Figure 10:
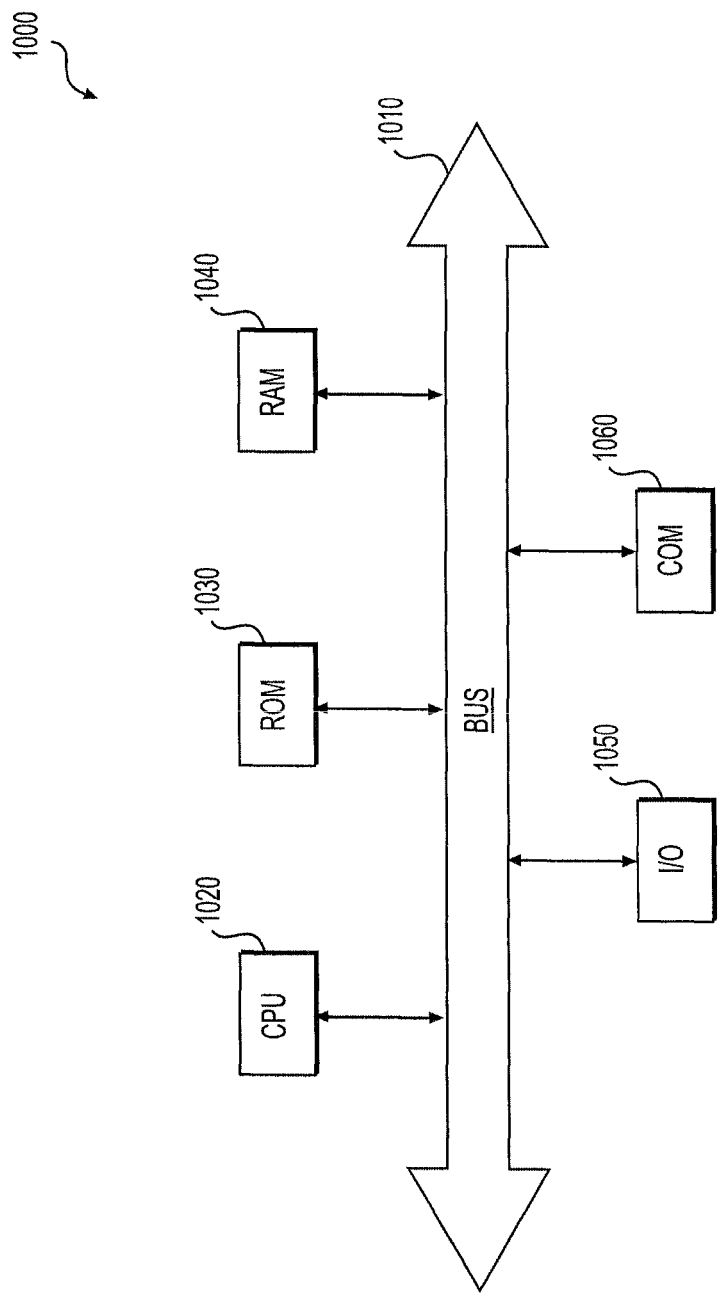
FIG. 10 is a block diagram of an exemplary computer system in which embodiments of the present disclosure may be implemented.

FIG. 10 provides a high-level functional block diagram illustrating an exemplary general purpose computer 1000. It is believed that those skilled in the art are familiar with the structure, programming, and general operation of such computer equipment and as a result, the drawings should be self-explanatory.

In an example, computer 1000 may represent a computer hardware platform for a server or the like. Accordingly, computer 1000 may include, for example, a data communication interface for packet data communication 1060. The platform may also include a central processing unit (CPU) 1020, in the form of one or more processors, for executing program instructions. The platform typically includes an internal communication bus 1010, program storage, and data storage for various data files to be processed and/or communicated by the platform such as ROM 1030 and RAM 1040, although the computer 1000 often receives programming and data via network communications 1070. The hardware elements, operating systems, and programming languages of such equipment are conventional in nature, and it is presumed that those skilled in the art are adequately familiar therewith. Computer 1000 also may include input and output ports 1050 to connect with input and output devices such as keyboards, mice, touchscreens, monitors, displays, etc. Of course, the various server functions may be implemented in a distributed fashion on a number of similar platforms, to distribute the processing load. Alternatively, the servers may be implemented by appropriate programming of one computer hardware platform.

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

The many features and advantages of the disclosure are apparent from the detailed specification, and thus, it is intended by the appended claims to cover all such features and advantages of the disclosure, which fall within the true spirit, and scope of the disclosure. Further, since numerous modifications and variations will readily occur to those skilled in the art, it is not desired to limit the disclosure to the exact construction and operation illustrated and described, and accordingly, all suitable modifications and equivalents may be resorted to, falling within the scope of the disclosure.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A computer-implemented method for optimizing the timing of message notifications for a mobile device of a user, the method comprising:
    determining a release weight for each of a plurality of geographic locations at a plurality of times, wherein the release weight is based on at least a user-specific factor and a real-time factor, wherein the real-time factor indicates a likelihood the user will interact with a message sent to the mobile device, wherein the real-time factor includes a movement and determined velocity of the mobile device;
    receiving an indication of a message to be sent for a client application executable at the mobile device of the user;
    upon receiving the indication of a message, requesting a current geographic location and determined velocity of the mobile device via a communication network;
    receiving a message weight associated with the message to be sent; and
    when the release weight of the current geographic location of the mobile device is determined to exceed the message weight, and when the determined velocity is between a first weight and a second weight, sending the message for display to the user at the mobile device via a message notification interface of an operating system of the mobile device, wherein the message is added to a message queue when the release weight is determined to be less than the message weight.

2. The method of claim 1, wherein the release weight is one of two states.

3. The method of claim 2, wherein a first state indicates the message should be sent and a second state indicates the message should not be sent.

4. The method of claim 3, further comprising:
    when the release weight of the current geographic location of the mobile device is the first state, sending the message for display to the user at the mobile device via a message notification interface of an operating system of the mobile device.

5. The method of claim 3, further comprising:
    when the release weight of the current geographic location of the mobile device is the second state, adding the message to the message queue.

6. The method of claim 1, wherein the release weight is weight with more than two values.

7. The method of claim 6, further comprising:
    when the release weight of the current geographic location of the mobile device is determined to be less than or equal to the message weight, adding the message to the message queue.

8. The method of claim 7, further comprising:
    displaying the added message from the message queue to the user at the mobile device when the release weight associated with the current time exceeds the message weight, a detected change in the current geographic location of the mobile device is determined and the release weight associated with the current geographic location exceeds the message weight, or once a predetermined period of time is determined to have elapsed.

9. The method of claim 8, further comprising:
    upon receiving an indication of an updated time or updated current geographic location of the mobile device, determining whether the release weight of the updated time or updated current geographic location of the mobile device exceeds the message weight; and
    displaying the message from the message queue to the user within a message notification view when the release weight of the updated time or updated current geographic location of the mobile device is determined to exceed the message weight.

10. The method of claim 1, wherein upon receiving the requested current geographic location of the mobile device, determining whether the current geographic location of the mobile device is within a geo-fence associated with targeted content; and when the current geographic location of the mobile device is determined to be within a geo-fence associated with targeted content, sending targeted content associated with the geo-fence for display to the user within a client application.

11. The method of claim 10, wherein the targeted content is an electronic advertisement provided by a third-party content provider that is not directly associated with the client application.

12. The method of claim 7, wherein a predetermined period of time is based on an expiration time associated with the message that is added to the message queue, and the message is sent from the message queue for display to the user at the mobile device when either the release weight of the current time and current geographic location of the mobile device is later determined to exceed the message weight before the expiration time has elapsed or once the expiration time for the message is determined to have elapsed.

13. The method of claim 12, wherein the expiration time associated with the message is based on a priority level assigned to the message by an application service provider associated with the client application.

14. The method of claim 1, wherein the release weight is further based on a general factor that is based on at least one of historic content consumption, historic content creation, and assumptions.

15. The method of claim 1, wherein the user-specific factor is based on at least one of historic user activity and direct feedback.

16. The method of claim 1, wherein the real-time factor is based on at least one of movement of the mobile device and current content consumption.

17. A system for delivery of electronic coupons with dynamically determined promotions to a mobile device of a user, the system comprising:
    a memory having processor-readable instructions stored therein; and
    a processor configured to access the memory and execute the processor-readable instructions, which when executed by the processor configures the processor to perform a plurality of functions, including functions to:
    determine a release weight based for each of a plurality of geographic locations at a plurality of times, wherein the release weight is one of two states and is based on at least a user-specific factor and a real-time factor, wherein the real-time factor indicates a likelihood the user will interact with a message sent to the mobile device, wherein the real-time factor includes a movement and determined velocity of the mobile device;
    receive an indication of a message to be sent for a client application executable at the mobile device-of the user;
    upon receiving the indication of a message, request a current geographic location and determined velocity of the mobile device via a communication network;
    receive a message weight associated with the message to be sent; and
    when the release weight of the current geographic location of the mobile device is determined to exceed the message weight, and when the determined velocity is between a first weight and a velocity weight, send the message for display to the user at the mobile device via a message notification interface of an operating system of the mobile device, wherein the message is added to a message queue when the release weight is determined to be less than the message weight.

18. The system of claim 17, wherein a first state of the release weight indicates the message should be sent and a second state of the release weight indicates the message should not be sent; and
    when the release weight of the current geographic location of the mobile device is the first state, send the message for display to the user at the mobile device via a message notification interface of an operating system of the mobile device; and when the release weight of the current geographic location of the mobile device is the second state, add the message to the message queue.

19. A computer readable medium storing instructions that, when executed by a computer, cause the computer to perform functions to:
    determine, for a mobile device of a user, a release weight based for each of a plurality of geographic locations at a plurality of times, wherein the release weight is one of two states and is based on at least a user-specific factor and a real-time factor, wherein the real-time factor indicates a likelihood the user will interact with a message sent to the mobile device, wherein the real-time factor includes a movement and determined velocity of the mobile device;
    receive an indication of a message to be sent for a client application executable at the mobile device of the user;
    receive a message weight associated with the message to be sent;
    upon receiving the indication of a message, request a current geographic location and determined velocity of the mobile device via a communication network;
    upon receiving the requested current geographic location of the mobile device, determine whether to the release weight for the current time and current geographic location exceeds the message weight; and
    when the release weight of the current time and current geographic location of the mobile device is determined to exceed the message weight, and when the determined velocity is between a first weight and a second weight, send the message for display to the user at the mobile device via a message notification interface of an operating system of the mobile device, wherein the message is added to a message queue when the release weight is determined to be less than the message weight.

* * * * *